United States Patent
Qiu et al.

(10) Patent No.: US 11,187,464 B2
(45) Date of Patent: Nov. 30, 2021

(54) SYSTEM FOR ADJUSTING TEMPERATURE OF TRANSMISSION OIL, HEAT EXCHANGE ASSEMBLY AND VALVE ASSEMBLY

(71) Applicant: Zhejiang Sanhua Automotive Components Co., Ltd., Zhejiang (CN)

(72) Inventors: Haoming Qiu, Zhejiang (CN); Zhiyong Liao, Zhejiang (CN); Yongjin Luo, Zhejiang (CN)

(73) Assignee: Zhejiang Sanhua Automotive Components Co., Ltd., Zhejiang (CN)

( * ) Notice: Subject to any disclaimer, the term of this patent is extended or adjusted under 35 U.S.C. 154(b) by 194 days.

(21) Appl. No.: 16/332,333

(22) PCT Filed: May 31, 2017

(86) PCT No.: PCT/CN2017/086525
§ 371 (c)(1),
(2) Date: Mar. 11, 2019

(87) PCT Pub. No.: WO2018/090598
PCT Pub. Date: May 24, 2018

(65) Prior Publication Data
US 2019/0234507 A1    Aug. 1, 2019

(30) Foreign Application Priority Data

Nov. 21, 2016 (CN) .......................... 201611040046.1
Nov. 21, 2016 (CN) .......................... 201611040101.7
(Continued)

(51) Int. Cl.
*F28D 1/00* (2006.01)
*F16K 49/00* (2006.01)
(Continued)

(52) U.S. Cl.
CPC ............... *F28D 1/00* (2013.01); *F16K 11/07* (2013.01); *F16K 49/005* (2013.01); *F16L 53/00* (2013.01);
(Continued)

(58) Field of Classification Search
CPC .... G05D 7/133; G05D 23/022; G05D 23/025; G05D 7/0133; F28F 27/00; F28F 27/02;
(Continued)

(56) References Cited

U.S. PATENT DOCUMENTS 3,768,731 A * 10/1973 Lavado ................ G05D 23/022
236/93 R
4,190,198 A * 2/1980 Casuga .................. F01M 5/007
236/34.5
(Continued)

FOREIGN PATENT DOCUMENTS

CN    101802469 A    8/2010
CN    104806739 A    7/2015
(Continued)

OTHER PUBLICATIONS

Japanese Office Action for Application No. 2019-515827, dated Mar. 16, 2020.
(Continued)

*Primary Examiner* — Len Tran
*Assistant Examiner* — Jenna M Hopkins
(74) *Attorney, Agent, or Firm* — Wolf, Greenfield & Sacks, P.C.

(57) ABSTRACT

A system for adjusting transmission oil temperature and a heat exchange assembly are provided. The heat exchange assembly includes a heat exchange core, a valve assembly, an adapter base, and a mounting plate fixed with the heat exchange core. The valve assembly is arranged in or partially located in a second passage of the heat exchange core.
(Continued)

The valve assembly has a first valve port and a first notch. The heat exchange core further includes a through passage in communication with a fourth port. When a first valve port is opened, a third port is in communication with the fourth port through a first passage, the second passage, the first notch and the first valve port in turn. When the first valve port is closed, the third port is in communication with a fifth port through the first passage, the second passage and the first notch in turn.

19 Claims, 8 Drawing Sheets

(30) Foreign Application Priority Data

Nov. 21, 2016 (CN) .......................... 201611040514.5
Nov. 21, 2016 (CN) .......................... 201611040875.X

(51) Int. Cl.
| | |
|---|---|
| *F25B 41/20* | (2021.01) |
| *F28D 9/00* | (2006.01) |
| *G05D 23/02* | (2006.01) |
| *F28F 27/00* | (2006.01) |
| *F28F 27/02* | (2006.01) |
| *F16L 53/00* | (2018.01) |
| *F16K 11/07* | (2006.01) |

(52) U.S. Cl.
CPC .............. *F25B 41/20* (2021.01); *F28D 9/005* (2013.01); *F28F 27/00* (2013.01); *F28F 27/02* (2013.01); *G05D 23/022* (2013.01); *G05D 23/025* (2013.01); *F16H 2700/02* (2013.01)

(58) Field of Classification Search
CPC ............. F28D 9/005; F28D 2021/0089; F16K 31/002; F16K 49/005
See application file for complete search history.

(56) References Cited

U.S. PATENT DOCUMENTS

| | | | | | |
|---|---|---|---|---|---|
| 4,336,903 | A | * | 6/1982 | Zirps | G05D 23/00 236/92 R |
| 4,763,834 | A | * | 8/1988 | Duprez | F01P 7/16 236/34.5 |
| 6,823,892 | B1 | * | 11/2004 | Knapp | F16K 15/026 137/512.2 |
| 7,819,332 | B2 | * | 10/2010 | Martin | F16H 57/0413 236/34.5 |
| 7,997,505 | B2 | * | 8/2011 | Martin | F01M 5/007 236/34.5 |
| 8,839,748 | B2 | * | 9/2014 | Kim | F28D 9/005 123/41.33 |
| 9,074,518 | B2 | * | 7/2015 | Kim | F01P 7/165 |
| 9,234,604 | B2 | * | 1/2016 | Kim | F28F 27/02 |
| 9,239,195 | B2 | * | 1/2016 | Kim | F01M 5/002 |
| 9,255,748 | B2 | * | 2/2016 | Cho | F28D 9/005 |
| 9,322,319 | B2 | * | 4/2016 | Kim | F01P 11/08 |
| 9,360,262 | B2 | * | 6/2016 | Kim | F28F 27/02 |
| 9,464,853 | B2 | * | 10/2016 | Sheppard | F28F 27/00 |
| 9,556,782 | B2 | * | 1/2017 | Kim | F28D 9/005 |
| 9,617,905 | B2 | * | 4/2017 | Seon | F28F 27/02 |
| 9,645,583 | B2 | * | 5/2017 | Kristoffersen | G05D 7/0133 |
| 9,702,481 | B2 | * | 7/2017 | Hunnicutt | F15B 13/0402 |
| 9,759,498 | B2 | * | 9/2017 | Kim | F01M 5/007 |
| 9,810,491 | B2 | * | 11/2017 | Kim | F28F 9/005 |
| 9,829,115 | B2 | * | 11/2017 | Cho | F16K 11/0716 |
| 9,945,623 | B2 | * | 4/2018 | Sheppard | F28D 9/005 |
| 10,007,281 | B2 | * | 6/2018 | Qiu | F16K 31/002 |
| 10,036,466 | B2 | * | 7/2018 | Kim | F01M 5/007 |
| 10,087,793 | B2 | * | 10/2018 | Boyer | F16H 57/0412 |
| 10,138,771 | B2 | * | 11/2018 | Ariyama | F28D 9/005 |
| 10,151,541 | B2 | * | 12/2018 | Kim | F28D 9/005 |
| 10,408,511 | B2 | * | 9/2019 | Wang | F25B 41/31 |
| 10,473,209 | B2 | * | 11/2019 | Zou | F28F 9/0075 |
| 10,619,530 | B2 | * | 4/2020 | Dries | F01P 7/16 |
| 2002/0066552 | A1 | | 6/2002 | Komoda | |
| 2002/0129926 | A1 | | 9/2002 | Yamaguchi | |
| 2008/0210410 | A1 | * | 9/2008 | Kalbacher | F28F 27/02 165/157 |
| 2009/0026405 | A1 | | 1/2009 | Sheppard et al. | |
| 2011/0127458 | A1 | | 6/2011 | Kozdras et al. | |
| 2012/0097365 | A1 | * | 4/2012 | Papoulis | F28F 27/00 165/61 |
| 2013/0133874 | A1 | * | 5/2013 | Kim | F01P 7/165 165/296 |
| 2013/0133875 | A1 | * | 5/2013 | Kim | F28D 9/0093 165/296 |
| 2013/0160972 | A1 | | 6/2013 | Sheppard et al. | |
| 2013/0327287 | A1 | * | 12/2013 | Kim | F28D 9/005 123/41.33 |
| 2014/0116648 | A1 | * | 5/2014 | Cho | F28D 9/005 165/96 |
| 2014/0150739 | A1 | * | 6/2014 | Kim | G05D 23/022 123/41.33 |
| 2015/0185738 | A1 | * | 7/2015 | Qiu | G05D 23/1333 236/101 A |
| 2015/0211395 | A1 | | 7/2015 | Gooden | |
| 2015/0369115 | A1 | * | 12/2015 | Kim | F28F 27/02 123/41.33 |
| 2016/0215664 | A1 | | 7/2016 | Boyer et al. | |
| 2017/0220056 | A1 | * | 8/2017 | Grumer | F01P 7/16 |

FOREIGN PATENT DOCUMENTS

| | | | |
|---|---|---|---|
| CN | 105277013 A | 1/2016 | |
| CN | 205036847 U | 2/2016 | |
| DE | 10 2012 113 213 A1 | 4/2014 | |
| DE | 10 2014 118 313 A1 | 12/2015 | |
| DE | 10 2015 014 830 A1 | 7/2016 | |
| EP | 3136035 A1 * | 3/2017 | ........... G05D 23/022 |
| JP | 2002-168591 A | 6/2002 | |
| JP | 2002-277177 A | 9/2002 | |
| JP | 2014-115071 A | 6/2014 | |
| KR | 10-1519961 B1 | 5/2015 | |
| WO | WO 2016/035910 A1 | 3/2016 | |

OTHER PUBLICATIONS

International Search Report and Written Opinion for International Application No. PCT/CN2017/086525, dated Sep. 1, 2017.
Extended European Search Report for European Application No. 17871049.7, dated May 4, 2020.

* cited by examiner

SYSTEM FOR ADJUSTING TEMPERATURE OF TRANSMISSION OIL, HEAT EXCHANGE ASSEMBLY AND VALVE ASSEMBLY

This application is a national stage filing under 35 U.S.C. § 371 of International Patent Application Serial No. PCT/CN2017/086525, filed May 31, 2017, which claims priority to Chinese patent application No. 201611040046.1, titled "HEAT EXCHANGE ASSEMBLY", Chinese patent application No. 201611040101.7, titled "HEAT EXCHANGE ASSEMBLY", Chinese patent application No. 201611040514.5, titled "VALVE ASSEMBLY", and Chinese patent application No. 201611040875.X, titled "VALVE ASSEMBLY", all filed with the China National Intellectual Property Administration on Nov. 21, 2016. The entire contents of these applications are incorporated herein by reference in their entireties.

FIELD

The present application relates to the field of fluid control, specifically to a system for adjusting a temperature of transmission oil, a heat exchange assembly and a valve assembly.

BACKGROUND

During running, relevant components of the vehicle need to be lubricated with lubricant in time to ensure the normal operation of the vehicle. If the lubricant has a poor lubricating performance, it will affect the service life of the vehicle. The lubricating performance of the lubricant is strongly related to its own temperature. If the lubricant temperature is overly high or overly low, the lubricating performance of the lubricant will be affected.

Lubricant temperature is generally not overly high during the normal running. However when the vehicle is overloaded or is set at the four-wheel drive mode to run on a snowfield or run off-road, the vehicle will operate under the excessive slip condition of the torque converter, which may cause the transmission lubricant to have an overly high temperature, thereby losing the lubricating performance.

The existing temperature adjustment function of the transmission lubricant is mainly realized by a cooling flow path composed of a thermostatic valve and an external cooling device.

However, the existing thermostatic valve needs to be connected to the external cooling device through pipelines, so that the arrangement of the components is complicated, the occupied space is large, and a high risk of leakage is also caused.

SUMMARY

In order to improve a miniaturization and an integration level of a transmission oil cooling system, a heat exchange assembly is provided in the present application, which includes a heat exchange core and a mounting plate fixed to the heat exchange core, and the heat exchange assembly further includes a first port, a second port, a third port, and a fourth port; the heat exchange core includes an end plate, and the heat exchange core further includes a first flow passage and a second flow passage which are isolated from each other, the first flow passage is in communication with the first port and the second port, and the second flow passage is in communication with the third port and the fourth port; and the second flow passage includes a first passage and a second passage, and wherein the heat exchange core further includes a through passage passing through the heat exchange core, the mounting plate is provided with a connection passage for communicating the through passage with the fourth port, and the second passage passes through the heat exchange core and one end of the second passage is in communication with the fourth port;

the heat exchange assembly further includes a valve assembly and an adapter base, the adapter base is provided with a cavity opposite to the second passage and a fifth port in communication with the cavity, and the adapter base is further provided with a sixth port in communication with the through passage; the valve assembly is provided in or partially provided in the second passage, and the valve assembly includes a main valve body and a thermal actuator mounted in the main valve body, and one end of the main valve body is fittingly connected to an inner wall of the fifth port in a sealed manner, and one end of the main valve body is fittingly connected to the fourth port or an inner wall of the second passage in a sealed manner, a side wall of the main valve body is provided with a first notch, and a first valve port is provided in the main valve body, the first valve port is located between the first notch and the fourth port, and the first valve port is not in communication or in communication with the fourth port when the thermal actuator is close to or away from the first valve port; and wherein, when the first valve port is opened, the third port is in communication with the fourth port through the first passage, the second passage, the first notch, and the first valve port sequentially; and when the first valve port is closed, the third port is in communication with the fifth port through the first passage, the second passage, and the first notch sequentially.

A valve assembly is integrated into the heat exchange assembly of the present application, so that the heat exchange assembly has both a heat exchange function and a fluid flow adjustment and switching function, and has a compact structure and a small volume, which can improve the miniaturization and integration level of the transmission oil cooling system.

Figure 1:
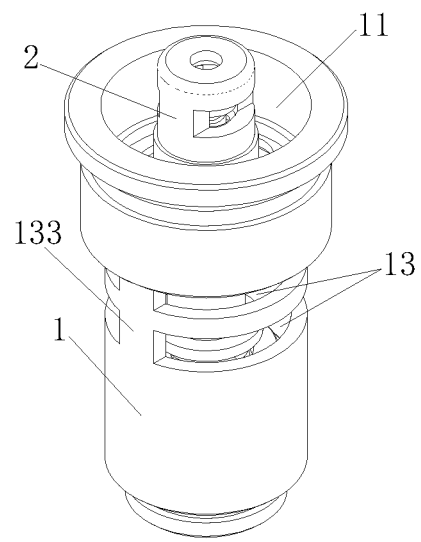
FIG. 1 is a schematic perspective view showing the structure of a valve assembly according to an embodiment of the present application.

The arrows in figures indicate the flow direction of fluid.

DETAILED DESCRIPTION

The initial deformation force described in this specification refers to the pressure generated when a spring in a compressed state is subjected to an external force to deform when the product is not in use.

The technical solutions are specifically described below with reference to the accompanying drawings and specific embodiments. The nouns indicating direction and position in the specification, such as top, bottom, left side, right side and the like, are all described in accordance with the corresponding directional and positional relationship in the drawings.

Figure 2:
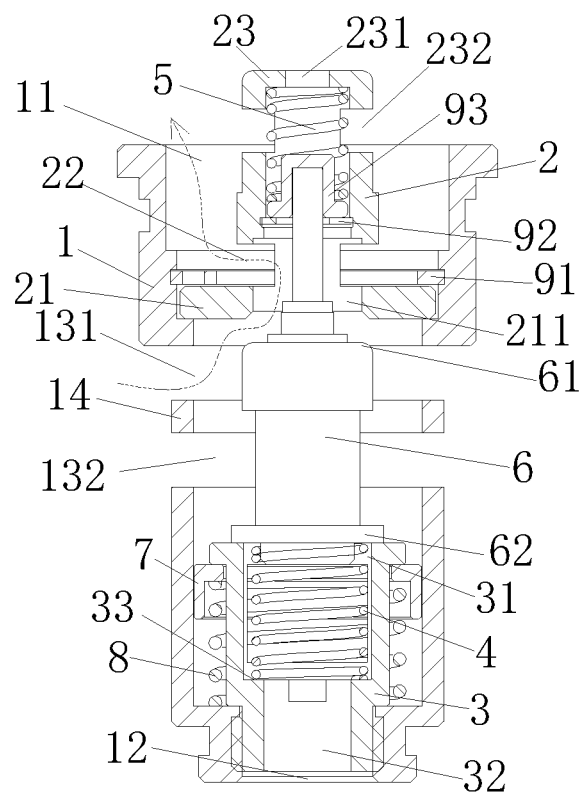
FIG. 2 is a schematic view showing the sectional structure of the valve assembly shown in FIG. 1 when a first valve port is closed and a second valve port is opened.

As shown in FIGS. 1 and 2, a valve assembly includes a hollow main valve body 1 and a thermal actuator 6 mounted in the main valve body 1. The main valve body 1 is open at two ends, and an upper valve bush 2 and a lower valve bush 3 are fixedly mounted at two end portions in the main valve body 1 respectively. A first spring 4 and a second spring 5 are further provided in the main valve body 1. One end of the first spring 4 abuts against the lower valve bush 3, and another end of the first spring 4 abuts against one end of the thermal actuator 6. One end of the second spring 5 abuts against another end of the thermal actuator 6, and another end of the second spring 5 abuts against the upper valve bush 2. The first spring 4 and the second spring 5 are in a compressed state, thus the thermal actuator 6 is fixed within the main valve body 1.

Figure 4:
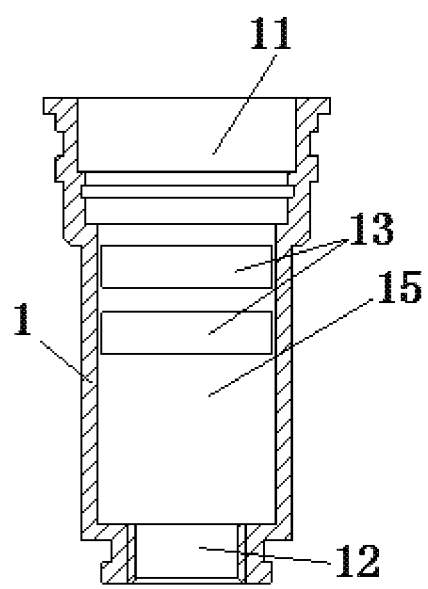
FIG. 4 is a schematic view showing the sectional structure of a main valve body of the valve assembly shown in FIG. 1.

As shown in FIG. 4, two ends of the main valve body 1 are respectively provided with a first opening 11 and a second opening 12. An inner diameter of the first opening 11 is greater than an inner diameter of the second opening 12, and an inner wall of the second opening 12 is provided with an inner screw thread. An accommodation cavity 15 is further provided within the main valve body 1, and the accommodation cavity 15 is located between the first opening 11 and the second opening 12. An inner diameter of the accommodation cavity 15 is smaller than the inner diameter of the first opening 11, and a stepped portion is formed between the first opening 11 and the accommodation cavity 15. The inner diameter of the second opening 12 is smaller than the inner diameter of the accommodation cavity 15, and a stepped portion is formed between the accommodation cavity 15 and the second opening 12.

A first notch 13 is provided on a side wall of the main valve body 1 corresponding to the accommodation cavity 15, and the first notch 13 is located above the lower valve bush 3. Specifically in this embodiment, the first notch 13 is close to the stepped portion formed between the first opening 11 and the accommodation cavity 15. In order to make the first notch 13 have a larger opening area and also make the main valve body 1 to be relatively stable, the first notch 13 includes a first sub-notch 131 and a second sub-notch 132. At the same time, an annular connection portion 14 is provided between the first sub-notch 131 and the second sub-notch 132, and the annular connection portion 14 may be a part of the side wall of the main valve body 1. If the annular connection portion 14 is not provided, in this case, when the first notch 13 is relatively large, a part of the side wall of the main valve body 13 corresponding to the first notch 13 is a connection post 133, thus the stability of the main valve body 1 is relatively low. The stability of the main valve body 1 can be improved by providing the annular connection portion 14.

Figure 5:
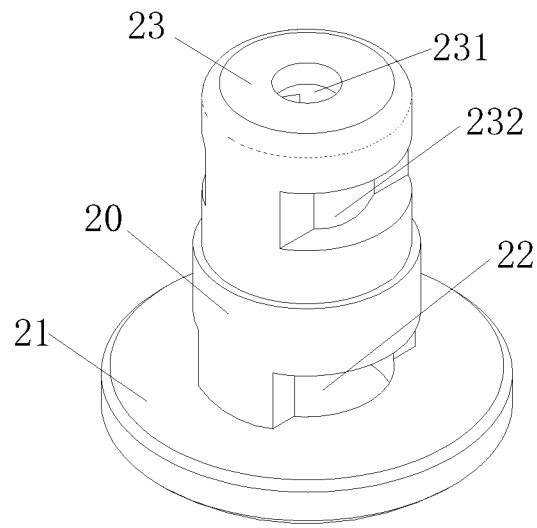
FIG. 5 is a schematic perspective view showing the structure of an upper valve bush of the valve assembly shown in FIG. 1.

As shown in FIG. 5, the upper valve bush 2 is a cap-like structure, and the upper valve bush 2 includes a support portion 21 with a large outer diameter and a main body portion 20 with a smaller outer diameter than the support portion 21. The outer wall of the main body portion is spaced apart from the inner wall of the accommodation cavity at a certain distance to form a fluid passage. One cavity is provided within the main body portion 20, and the second spring 5 is accommodated in the cavity of the main body portion 20. A support cap 93 is further provided in the cavity of the main body portion 20, and the support cap 93 is fixed by a second retainer 92. One end of the second spring 5 abuts against an inner bottom surface of a bottom portion 23 of the main body portion 20, and another end of the second spring 5 abuts against the support cap 93. The support portion 21 is further provided with a second valve port 211, and the second valve port 211 is opposite to the cavity of the main body portion 20 and in communication with the cavity of the main body portion 20, and the second valve port 211 may be a part of the cavity. A second notch 22 is provided in the main body portion 20 at a portion close to the support portion 21, the second notch 22 is located below the support cap 93, and the second notch 22 is in communication with the second valve port 211. In this case, after passing through the second valve port 211, fluid can flow out of the upper valve bush 2 through the second notch 22.

Figure 6:
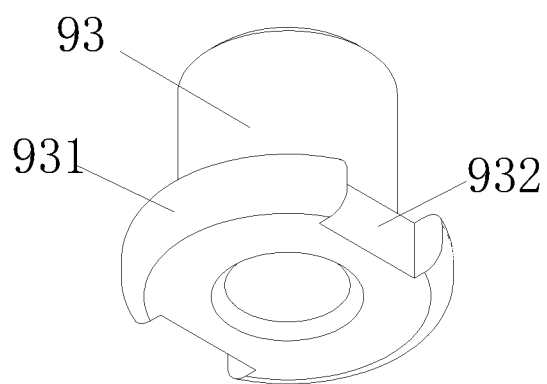
FIG. 6 is a schematic perspective view showing the structure of a support cap of the valve assembly shown in FIG. 1.

In some applications where the requirement of fluid flow resistance change is high, since the second notch 22 is located below the support cap 93, the flow area of the second notch 22 is still not large enough, which may result in a large flow resistance reduction. In this embodiment, in order to further decrease the flow resistance reduction and increase the flow area of the fluid flowing out of the upper valve bush, as shown in FIG. 6, at least one slot opening 932 is further provided at an outer extension portion 931 of the support cap 93. In this case, a fluid passage allowing fluid to flow through is formed between the slot opening 932 and the inner wall of the upper valve bush 2.

In addition, a third notch 232 may be further provided at the upper end portion of the support cap 93 of the main body portion 20 of the upper valve bush 2, and after flowing through the second valve port 211, a part of fluid can pass through the fluid passage formed between the slot opening 932 and the inner wall of the upper valve bush 2 and then flow out of the upper valve bush 2 through the third notch 232. In order to improve the stability of the support cap 93 during the movement, and prevent the stroke of the support cap 93 from intersecting with the third notch 232, the third notch 232 may locate above the outer extension portion 931 when the movement of the support cap 93 compressing the second spring 5 is at the maximum stroke.

A third opening 231 is further provided at the bottom portion 23 of the main body portion 20 according to this embodiment, and in this case, the flow resistance of the fluid flowing out of the upper valve bush 2 is further reduced.

Through the above arrangement, the fluid can flow out of the upper valve bush 2 more smoothly and the flow resistance of the fluid flowing out of the upper valve bush 2 can be reduced.

As shown in FIG. 2, the support portion 21 of the upper valve bush 2 abuts against the stepped portion formed between the first opening 11 and the accommodation cavity 15, and the upper valve bush 2 may be fixed by a first retainer 91, and the support portion is in a clearance fit with the inner wall of the first opening. It should be noted that the upper valve bush 2 can also be fixed by other ways (for example, riveting, threaded connection, etc.) In order to improve the sealing property, a sealing ring may be further provided between the support portion 21 and the inner wall of the accommodation cavity 15. In this case, the first notch 13 may be in communication with each of the second notch, the third notch and the third opening through the second valve port 211.

As shown in FIG. 2, a part of the lower valve bush 3 is located in the accommodation cavity 15, and another part of the lower valve bush 3 is located at the second opening 12 and is threadedly connected to the inner wall of the second opening 12.

Figure 7:
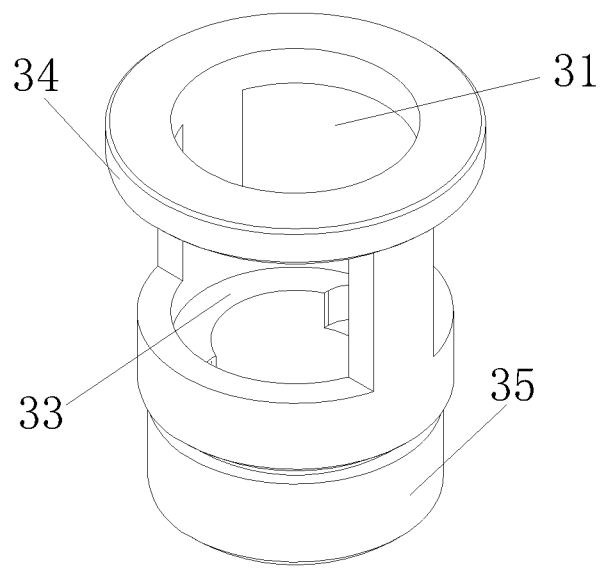
FIG. 7 is a schematic perspective view showing the structure of a lower valve bush of the valve assembly shown in FIG. 1.

As shown in FIG. 7, the lower valve bush 3 includes a valve seat portion 34, a spring support seat 33, a fitting portion 35 and a through hole 32 passing through the lower valve bush 3. A first valve port 31 passing through the valve seat portion is provided in the valve seat portion 34, the first valve port 31 may be a part of the through hole 32, and the first valve port is relatively away from the first opening with respect to the first notch. The fitting portion 35 is provided with an outer screw thread, and the outer screw thread may be engaged with the inner screw thread of the second opening 12 of the main valve body 1, to fixedly install the lower valve bush 3.

In this embodiment, in order to facilitate the installation of the lower valve bush 3, a recess 37 caved in the spring support portion 33 is further provided. The recess 37 may be a polygonal structure or multiple recessed structures, which are not limited herein.

Figure 8:
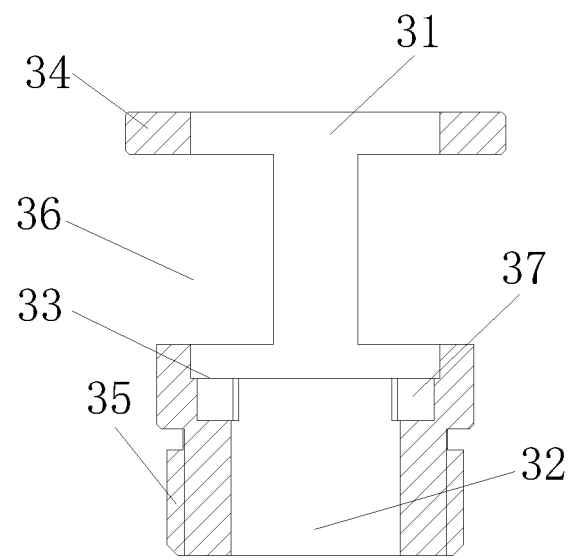
FIG. 8 is a schematic view showing the sectional structure of the lower valve bush shown in FIG. 7.

As shown in FIG. 8, in this embodiment, a fourth notch 36 is further provided between the spring support portion 33 and the valve seat portion 34. The fourth notch 36 is in communication with a part of the through hole 32 corresponding to the fitting portion 35, that is, the fluid flowing through the fourth notch 36 can flow out of the lower valve bush 3 through a lower end port of the through hole 32.

As shown in FIG. 2, the fitting portion 35 of the lower valve bush 3 and the second opening 12 of the main valve body 1 are fixed by threaded connection. One end of the first spring 4 abuts against the thermal actuator 6, and another end of the first spring 4 abuts against the spring support portion 33.

The outer diameter of the valve seat portion 34 is greater than the outer diameter of other parts, besides the valve seat portion 34, of the lower valve bush 3, and the outer diameter of the valve seat portion 34 is smaller than the inner diameter of the accommodation cavity 15, and a passage allowing fluid flow is formed between the outer wall of the valve seat portion 34 and the inner wall corresponding to the accommodation cavity 15. A pressure relief ring 7 and a third spring 8 are further provided within the accommodation cavity 15, the pressure relief ring is provided with a through hole, and the pressure relief ring is sleeved on the lower valve bush though the through hole. The inner diameter of the through hole of the pressure relief ring 7 is smaller than the outer diameter of the valve seat portion, so that the pressure relief ring 7 can abut against the valve seat portion 34, and the pressure relief ring 7 is in a sliding fit with the inner wall corresponding to the accommodation cavity 15. One end of the third spring 8 abuts against the pressure relief ring 7, and another end of the third spring 8 abuts against the stepped portion formed between the accommodation cavity 15 and the second opening 12, and the third spring 8 is in a compressed state. In a normal state, the pressure relief ring 7 abuts against the valve seat portion 34 under the action of the third spring 8, the passage allowing fluid flow formed between the outer wall of the valve seat portion 34 and the inner wall corresponding to the accommodation cavity 15 is closed by the pressure relief ring 7, and the passage allowing fluid flow formed between the outer wall of the valve seat portion 34 and the inner wall corresponding to the accommodation cavity 15 cannot be in communication with the fourth notch 36. When the force acting on the upper end surface of the pressure relief ring 7 by the fluid is greater than the initial elastic deformation force of the third spring 8, the pressure relief ring 7 moves downward to compress the third spring 8; when the pressure relief ring 7 moves downward to intersect the fourth notch 36 or below the fourth notch 36, the passage allowing fluid flow formed between the outer wall of the valve seat portion 34 and the inner wall corresponding to the accommodation cavity 15 is in communication with the second opening 12 through the fourth notch 36.

Figure 3:
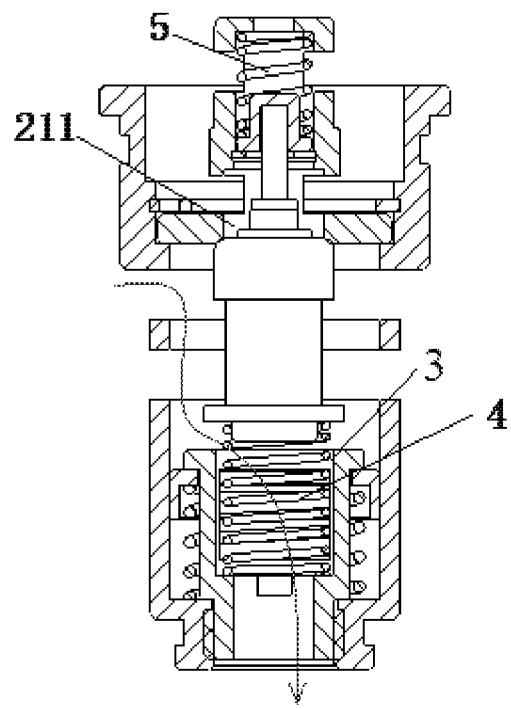
FIG. 3 is a schematic view showing the sectional structure of the valve assembly shown in FIG. 1 when the second valve port is closed and the first valve port is opened.

As shown in FIGS. 2 and 3, the thermal actuator 6 includes a first valve core 62 and a second valve core 61. The first valve core 62 corresponds to the first valve port 31, and the first valve port 31 can be opened and closed by the first valve core 62. The second valve core 61 corresponds to the second valve port 211, and the second valve port 211 can be opened and closed by the second valve core 61.

Moreover, the initial elastic deformation force of the second spring 5 is greater than the elastic deformation force of the first spring when the first valve port 31 is closed. In this case, when the first valve port 31 is closed, if the temperature of the fluid flowing in from the first notch 13 is relatively high, the thermosensitive substance in the thermal actuator 6 will continue to expand. At this time, an ejector rod of the thermal actuator 6 starts to be able to move upward to compress the second spring 5, thereby preventing excessive expansion of the thermosensitive substance which may damage the thermal actuator 6.

The valve assembly in this embodiment includes at least two states: in a first state, the first valve port is opened and the second valve port is closed, and in a second state, the first valve port is closed and the second valve port is opened. When the temperature of the fluid flowing in from the first notch 13 is relatively low, the first valve core 62 of the thermal actuator 6 is away from the first valve port 31 under the action of a restoring force of the first spring 4, at this time, the first valve port 31 is opened and the second valve port 211 is closed, and after flowing in from the first notch 13, the fluid can flow out sequentially through the first valve port 31, the through hole 32, and the second opening 12. When the temperature of the fluid flowing in from the first notch 13 is relatively high, the thermal actuator 6 is thermally expanded, the first valve core 62 moves downward to compress the first spring 4 until the first valve port 31 is closed, and then if the thermal actuator 6 continues to expand, the valve rod moves upward to compress the second spring 5, at this time, the first valve port is closed and the second valve port is opened. After the fluid flowing in from the first notch 13, a part of the fluid can flow out sequentially through the second valve port 211, the second notch 22 and the first opening 11, and a part of the fluid can flow out sequentially through the second valve port 211, the third notch 232 and the third opening 231.

It should be noted that the second spring may not be provided, at this time, one end, protruding out of the thermal actuator, of the valve rod abuts against the upper valve bush or is fixed to the upper valve bush. In this embodiment, by providing the second spring, it may have a buffer function to prevent the thermal actuator from being damaged due to excessive expansion.

This embodiment further includes a pressure relief state, in a case that the first valve port 31 is closed, if the other external devices or pipelines are blocked after the fluid flowing out of the valve assembly, the fluid cannot flow out of the valve assembly, so that when the pressure of the fluid is greater than the initial elastic deformation force of the third spring, the pressure relief ring 7 moves downward. The pressure relief ring 7 moves downward to compress the third spring 8, and when the pressure relief ring 7 moves downward to intersect the fourth notch 36 or below the fourth notch 36, the fluid flows out through the passage allowing fluid flow formed between the outer wall of the valve seat portion 34 and the inner wall corresponding to the accommodation cavity 15, the fourth notch 36, the through hole 32 and the second opening 12 in sequence.

It should be noted that when the function of pressure relief is not required, the lower valve bush 3 can be integrated with the main valve body 1 at this time, that is, the valve seat portion 34 and the spring support portion 33 of the lower valve bush 3 are a part of the main valve body 1, for example, an end portion of the second opening 12 corresponding to the stepped portion formed between the second opening 12 and the accommodation cavity 15 may act as the first valve port, and then a spring support seat 33 is further provided in the second opening 12.

Figure 9:
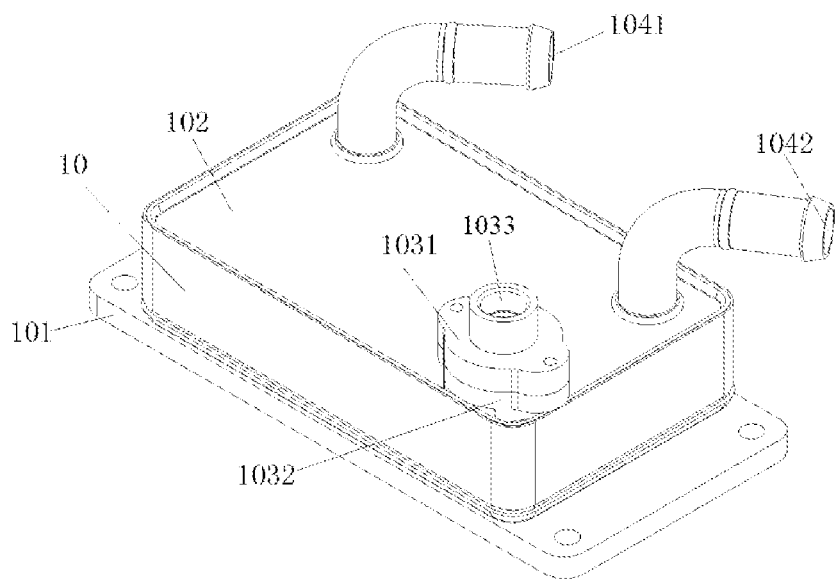
FIG. 9 is a schematic perspective view showing a heat exchange assembly mounted with a valve assembly according to an embodiment of the present application.
Figure 10:
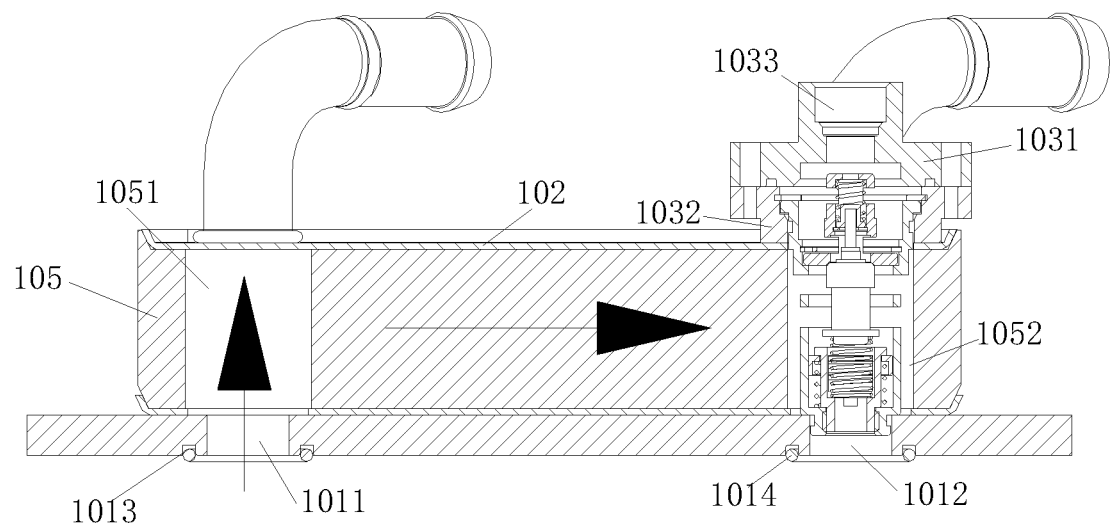
FIG. 10 is a schematic sectional view of FIG. 9.
Figure 11:
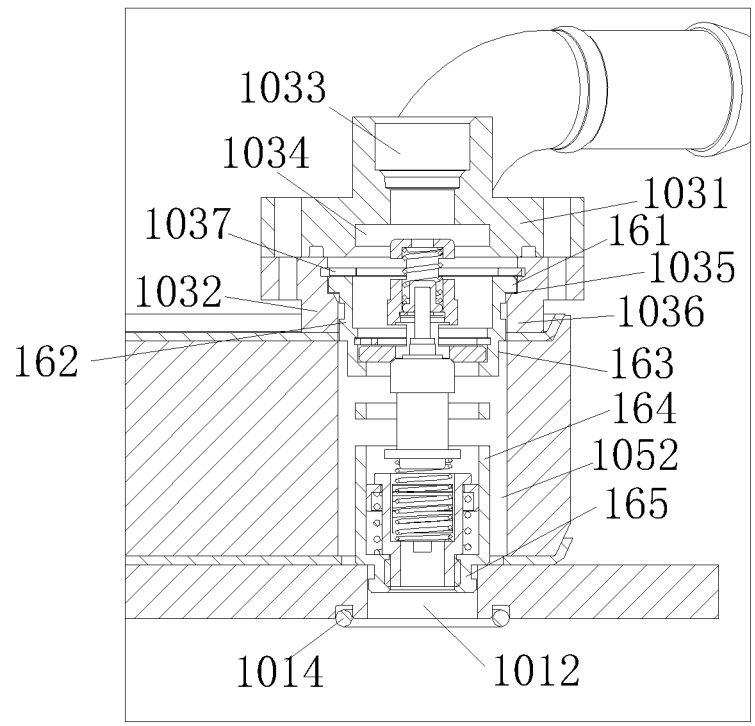
FIG. 11 is a partially enlarged schematic view showing the portion of the valve assembly in FIG. 10.

FIGS. 9 to 11 shows the heat exchange assembly mounted with the above valve assembly. As shown in Figures, the heat exchange assembly includes a heat exchange core 10, a mounting plate 101 fixed to the heat exchange core, an adapter base, a first port 1041, a second port 1042, a third port 1011, and a fourth port 1012. The heat exchange core 10 includes an end plate 102, and a first flow passage and a second flow passage which are isolated from each other, and fluid flowing in the first flow passage can exchange heat with fluid flowing in the second flow passage. The first flow passage is in communication with the first port 1041 and the second port 1042, and the second flow passage is in communication with the third port 1011 and the fourth port 1012.

The first port 1041 and the second port 1042 are connected to an external system by the form of connecting pipes. The third port 1011 and the fourth port 1012 are formed in the mounting plate 101, and the third port 1011 and the fourth port 1012 pass through the mounting plate 101, so that the mounting plate may be directly fixed to the transmission, which is convenient to mount and has a small risk of leakage. In order to further improve the sealing property and prevent the risk of leakage, a sealing ring 1013 and a sealing ring 1014 are respectively provided at outer peripheral sides of the third port 1011 and the fourth port 1012 of the mounting plate 101.

The second flow passage includes a first passage 1051 and a second passage 1052, one end of the first passage 1051 is in communication with the third port 1011, and another end of the first passage 1051 is blocked by the end plate 102. One end of the second passage 1052 is in communication with the fourth port 1012, and another end of the second passage 1052 is in communication with the adapter base.

As shown in FIGS. 10 and 11, the adapter base includes a first adapter base 1031 and a second adapter base 1032. The first adapter base 1031 includes an accommodation cavity 1034 and a fifth port 1033 in communication with the accommodation cavity 1034. The second adapter base 1032 includes a base body 1036, a cavity formed in the base body 1036 and passing through the base body 1036, and a step 1035 is formed at the inner wall of the base body 1036 corresponding to the cavity passing through the base body 1036.

The second adapter base 1032 is fixed to the end plate 102, and for example, the second adapter base 1032 is fixed to the end plate 102 in a sealed manner by welding, threaded connection or the like. Moreover, the cavity passing through the base body 1036 corresponds to the second passage 1052. The first adapter base 1031 is fixed to the second adapter base 1032 by threaded connection, or the like, and the cavity passing through the base body 1036 corresponds to the accommodation cavity 1034. The fifth port 1033 can be in communication with at least a part of the cavity passing through the base body 1036 through the accommodation cavity 1034. The first adapter base and the second adapter base are fixedly connected by screws, and in order to improve the sealing property, a sealing ring may be provided between sealing surfaces of the first adapter base 1031 and the second adapter base 1032.

The valve assembly is arranged in the second passage 1052, and at least a part of the valve assembly is located in the second passage 1052. In this embodiment, at least a part of the valve assembly is located in the adapter base. The valve assembly is fixed by providing a retainer ring 1037 at the second adapter base 1032, thereby limiting an axial displacement of the valve assembly.

As shown in FIG. 11, the main valve body 1 includes a first fitting portion 161, a second fitting portion 162, a third fitting portion 163, a flow guide portion 164 and a fourth fitting portion 165, the outer diameters of which are gradually decreased. The first fitting portion 161 is in a clearance fit with the inner wall of the base body 1036 corresponding to the cavity passing through the base body 1036, and a step formed between the first fitting portion 161 and the second fitting portion 162 abuts against the step 1035 formed on the inner wall of the base body 1036 corresponding to the cavity passing through the base body 1036. The second fitting portion 162 is also in a clearance fit with the inner wall of the base body 1036 corresponding to the cavity passing through the base body 1036, and a sealing ring may be further provided between the second fitting portion 162 and the inner wall of the base body 1036 corresponding to the cavity passing through the base body 1036, thereby improving the sealing property and reducing inner leakage.

In order to improve the heat exchange performance of a heat exchanger and avoid a problem that the fluid cannot be uniformly distributed because of the obstruction of the valve assembly when the fluid flows from the first passage 1051 to the second passage 1052, the end surface of the second fitting portion 162 away from the first adapter base 1031 does not go beyond the end plate 102, and the outer diameter of the third fitting portion 163 is smaller than the inner diameter of the second passage 1052, in this case, when the fluid flows from a passage between plates into the second passage 1052, all passages between plates or most of the passages between plates are not obstructed by the valve assembly. All passages between plates or most of the passages between plates are in communication with the second passage 1052, and the fluid can smoothly flow from the passages between plates into the second passage 1052, so that the uniform distribution of the fluid entering the first passage 1051 in the passages between plates is improved, thereby improving the heat exchange performance.

In order to further reduce a flow resistance of the fluid flowing form the passages between plates into the second passage 1052, the end of the third fitting portion 163 away from the first adapter base 1031 is located below the second valve port 211, and this end portion is formed with a shoulder for supporting the support portion 21 of the upper valve bush 2. The flow guide portion 164 is located between the third fitting portion 163 and the fourth fitting portion 165, and the flow guide portion 164 is also located in the second passage 1052. The outer diameter of the flow guide portion 164 is smaller than the outer diameter of the third fitting portion 163, and a difference between the outer diameter of the flow guide portion 164 and the inner diameter of the second passage 1052 is greater than a difference between the outer diameter of the third fitting portion 163 and the inner diameter of the second passage 1052. Moreover, the first notch is located at the flow guide portion 164, which facilitates fluid flowing into the valve assembly.

The fourth fitting portion 165 extends into the fourth port 1012, and the fourth fitting portion 165 is in a clearance fit with the fourth port 1012. The inner diameter of the fourth port is smaller than the inner diameter of the second passage, and the shoulder formed between the flow guide portion 164 and the fourth fitting portion 165 abuts against or adjoins the mounting plate. In order to reduce the risk of inner leakage and improve the sealing property, a sealing ring is further provided between the fourth fitting portion 165 and the fourth port 1012.

Figure 12:
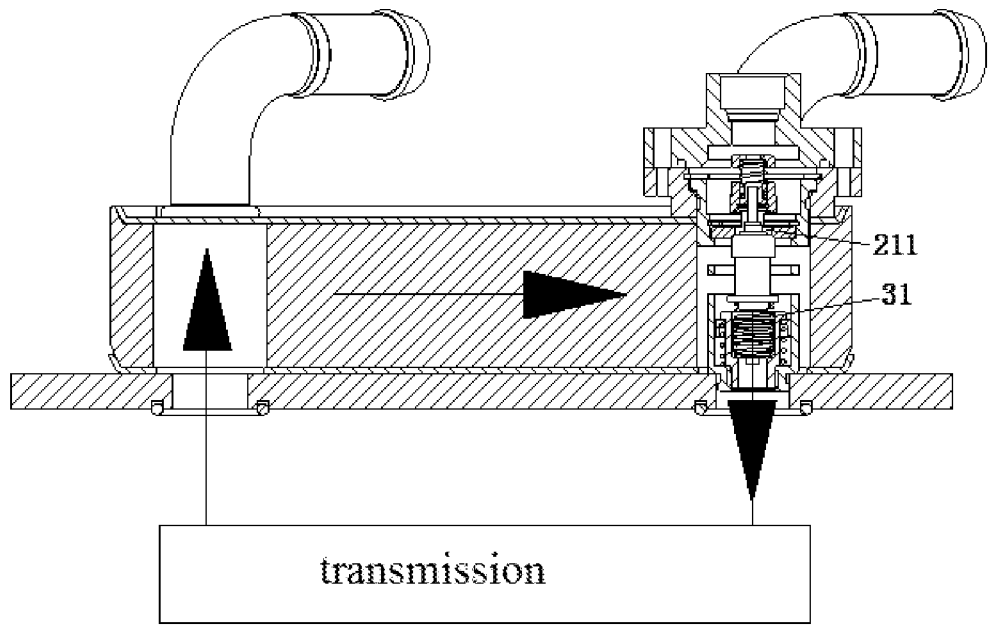
FIG. 12 is a schematic view showing the operation of a system, having the heat exchange assembly of FIG. 9, for adjusting a temperature of transmission oil of when the cooling oil is at a low temperature.
Figure 13:
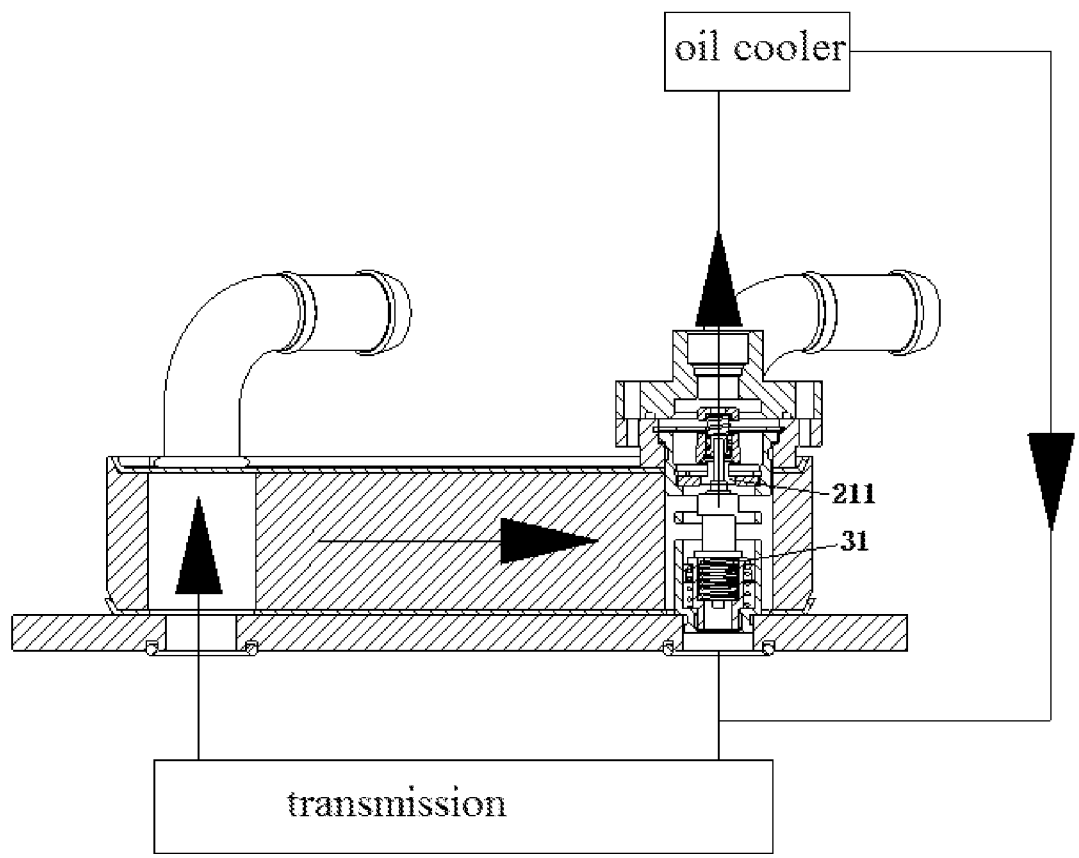
FIG. 13 is a schematic view showing the operation of the system, having the heat exchange assembly of FIG. 9, for adjusting the temperature of transmission oil of when the cooling oil is at a high temperature.

FIGS. 12 and 13 show a system for adjusting the temperature of transmission oil having the above heat exchange assembly. The system for adjusting the temperature of transmission oil includes a transmission, a heat exchange assembly, an oil cooler, and an engine water tank (not shown in Figures). The first port and the second port of the heat exchange assembly are in communication with the engine water tank through pipelines, and the third port and the fourth port are in communication with an inlet and an outlet of the transmission directly or through pipelines. One flow channel of the oil cooler is in communication with the fifth port of the heat exchange assembly and the inlet of the transmission through pipelines, and another flow channel of the oil cooler may be in communication with a cooling system (not shown in Figures).

When the temperature of the cooling oil coming out of the outlet of the transmission and entering the heat exchange core for heat exchange is in a normal state, the cooling oil enters the valve assembly through the first notch, and since the thermal actuator is under the action of a restoring force of the first spring to allow the first valve port 31 in an open state and the second valve port 211 in a closed state, the cooling oil can flow through the first valve port 31 and then flow back to the transmission through the fourth port and the inlet of the transmission, thus completing one cycle.

When the temperature of the cooling oil coming out of the outlet of the transmission and entering the heat exchange core for heat exchange exceeds the normal temperature, the cooling oil flows into the valve assembly through the first notch, and at this time, the thermal actuator is thermally expanded to move downward to close the first valve port 31, and the first valve port 31 is in a closed state and the second valve port 211 is in an open state, and the cooling oil can flow through the second valve port 211 and then through the fifth port to flow toward the oil cooler, and the high-temperature cooling oil is cooled to the normal temperature state in the oil cooler through heat exchange and then flows back to the of the transmission through the inlet of the transmission, thus completing one cycle.

Further, when the temperature of the cooling oil is high and the oil cooler is clogged, at this time, although the first valve port 31 is in the closed state, the high-temperature cooling oil can use the pressure relief function of the valve assembly to enable the cooling oil to flow back to the transmission through the passage allowing fluid flow formed between the outer wall of the valve seat portion 34 and the inner wall corresponding to the accommodation cavity 15, the fourth port and the inlet of the transmission, thereby preventing damages to the transmission due to the oil shortage.

Figure 14:
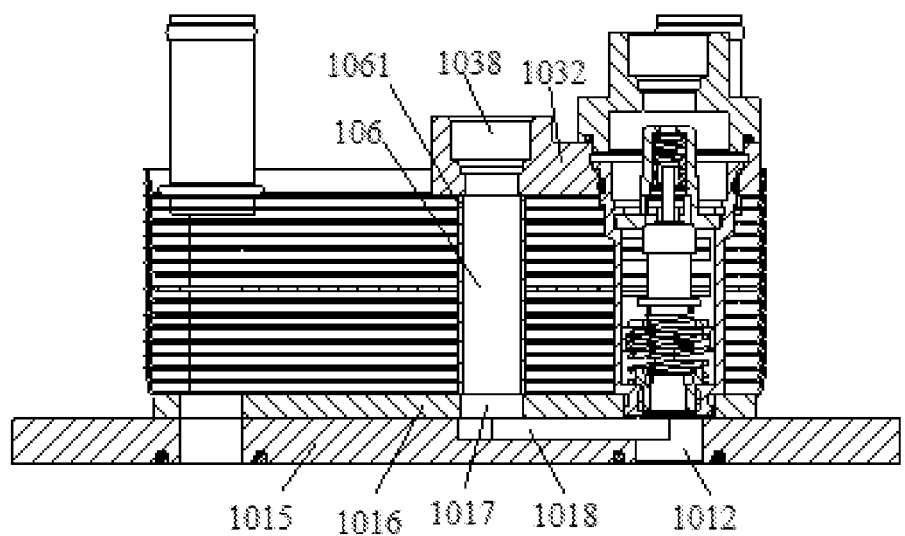
FIG. 14 is a schematic perspective view showing the structure of a heat exchange assembly mounted with a valve assembly according to another embodiment of the present application.

FIG. 14 shows the heat exchange assembly according to another embodiment of the present application. Unlike the heat exchange assembly of the above embodiment, in the heat exchange assembly of this embodiment, the heat exchange core is further provided with a through passage 106 in communication with the fourth port 1012. The through passage 106 passes through the heat exchange core 105, and the through passage 106 is not in communication with either the first passage or the second passage of the heat exchange core.

As shown in the Figure, in order to facilitate the connection of the through passage 106 to the external system, the second adapter base 1032 is further provided with a sixth port 1038, the sixth port 1038 is disposed opposite to the through passage 106 and the sixth port 1038 is in communication with the through passage 106.

In order to prevent the through passage 106 from communicating with the first passage and the second passage, in this embodiment, a connecting pipe 1061 is provided in the heat exchange core to realize the object. Certainly, this object can also be realized by other means, for example, by forming flanged holes in the sheets constituting the heat exchange core, and stacking the sheets to allow the stacked flanged holes to form the through passage 106.

In order to facilitate the fitting and installation of the fourth fitting portion and the mounting plate, and also allow the communication between the through hole and the fourth port, the mounting plate 101 includes a first mounting plate 1015 and a second mounting plate 1016. The second mounting plate 1016 is fixed to the heat exchange core by welding, and the first mounting plate 1015 is fixed to the second mounting plate 1016 by welding. The second mounting plate 1016 is further provided with a connection hole 1017 in communication with the through hole 106, and the first mounting plate 1015 is provided with a groove 1018. Two ends of the groove 1018 are respectively in communication with the connection hole 1017 and the fourth port 1012, and the groove 1018 cooperates with the second mounting plate 1015 to form a connection passage connecting the through passage with the fourth port.

It should be noted that the first mounting plate and the second mounting plate can also be formed as one mounting plate, while in this embodiment, the mounting plate is divided into two parts, thus the processing is simple.

Other structures and features of the heat exchange assembly of this embodiment are the same as or similar to those of the heat exchange assembly of the above embodiments, thus will not be described herein again.

Figure 15:
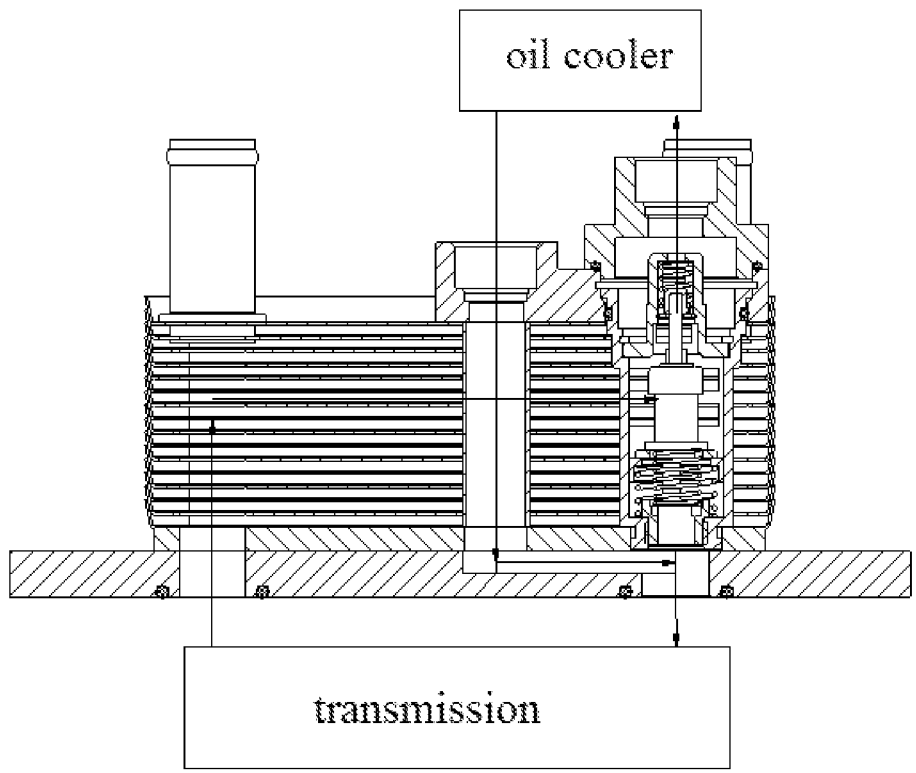
FIG. 15 is a schematic view showing the operation of a system, having the heat exchange assembly of FIG. 14, for adjusting a temperature of transmission oil of when the cooling oil is at a low temperature.
Figure 16:
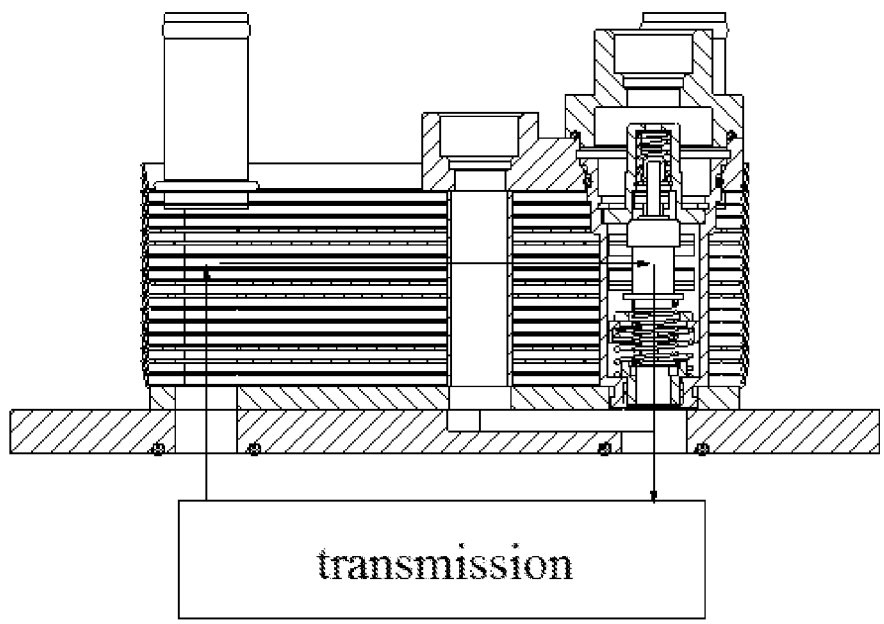
FIG. 16 is a schematic view showing the operation of a system, having the heat exchange assembly of FIG. 14, for adjusting the temperature of transmission oil of when the cooling oil is at a high temperature.

FIGS. 15 and 16 show a system for adjusting the temperature of transmission oil including the heat exchange assembly according to this embodiment. Unlike the system for adjusting the temperature of transmission oil shown in FIGS. 12 and 13, in this embodiment, the heat exchange assembly is provided with the through passage 106, in this case, the outlet of the oil cooler can directly communicate with the fourth port 1012 through the through passage 106, so that the inlet of the transmission only needs to be butted with the fourth port 1012, which realizes a high integration level and further reduces the risk of leakage.

Other structures and features of this embodiment are the same as or similar to the system for adjusting the temperature of transmission oil shown in FIGS. 12 and 13, thus will not be described herein again.

The embodiments described hereinabove are only specific implementations of the present application, and are not intended to limit the scope of the present application in any form. The terms indicating direction and position herein, such as upper, lower, left and right, are described with reference to the accompanying drawings, and are not intended to limit the direction and position. Although the present application is disclosed by preferred embodiments, the preferred embodiments should not be interpreted as limitation to the present application. Those skilled in the art can make many possible variations and modifications to the technical solutions of the present application or modify them to equivalent variations based on the disclosed technical contents, without departing from the scope of the technical solution of the present application. Therefore, any simple modifications, equivalent variations, and modifications made to the above embodiments based on the technical essence of the present application, without departing from the content of the technical solution of the present application, still fall within the scope of protection of the technical solutions of the present application.

The invention claimed is:

1. A heat exchange assembly, comprising a heat exchange core and a mounting plate fixed to the heat exchange core, and the heat exchange assembly further comprising a first port, a second port, a third port, and a fourth port; the heat exchange core comprising an end plate, and the heat exchange core further comprising a first flow passage and a second flow passage which are isolated from each other, the first flow passage being in communication with the first port and the second port, and the second flow passage being in communication with the third port and the fourth port; and the second flow passage comprising a first passage and a second passage, and wherein the heat exchange core further comprises a through passage passing through the heat exchange core, the mounting plate is provided with a connection passage for communicating the through passage with the fourth port, and the second passage passes through the heat exchange core and one end of the second passage is in communication with the fourth port;

the heat exchange assembly further comprises a valve assembly and an adapter base, the adapter base is provided with a cavity opposite to the second passage and a fifth port in communication with the cavity, and the adapter base is further provided with a sixth port in communication with the through passage; the valve assembly is provided in or partially provided in the second passage, and the valve assembly comprises a main valve body and a thermal actuator mounted in the main valve body, and one end of the main valve body is fixed to an inner wall corresponding to the cavity in the adapter base in a sealed manner, and another end of the main valve body is fittingly connected to the fourth port or an inner wall of the second passage in a sealed manner, a side wall of the main valve body is provided with a first notch, and a first valve port is provided in the main valve body, the first valve port is located between the first notch and the fourth port, and the first valve port is not in communication or in communication with the fourth port under an action of the thermal actuator; and wherein, when the first valve port is opened, the third port is in communication with the fourth port through the first passage, the second passage, the first notch, and the first valve port sequentially; and when the first valve port is closed, the third port is in communication with the fifth port through the first passage, the second passage, and the first notch sequentially.

2. The heat exchange assembly according to claim 1, wherein the another end of the main valve body is fixed to an inner wall of the fourth port in a sealed manner; the main valve body further comprises a flow guide portion located in the second passage, the first notch is located at the flow guide portion, and an outer diameter of the flow guide portion is smaller than an inner diameter of the second passage.

3. The heat exchange assembly according to claim 2, wherein two ends of the main valve body are provided with a first opening and a second opening, respectively; the main valve body comprises an accommodation cavity, and the accommodation cavity is located between the first opening and the second opening; a part, corresponding to the accommodation cavity, of the side wall of the main valve body is provided with the first notch; the valve assembly is provided with an upper valve bush at the first opening or at a position close to the first opening, and an end of the thermal actuator is supported by the upper valve bush; the upper valve bush comprises a support portion and a main body portion, a diameter of the first opening is greater than an inner diameter of the accommodation cavity, and a stepped portion is formed between the first opening and the accommodation cavity; a first retainer is provided to allow the support portion to abut against the stepped portion between the first opening and the accommodation cavity, the support portion is in a clearance fit with an inner wall of the first opening, and the main body portion is spaced apart from the inner wall of the first opening at a distance to form a flow passage.

4. The heat exchange assembly according to claim 3, wherein a first spring and a second spring are provided in the main valve body, and the first spring and the second spring are in a compressed state, two ends of the thermal actuator respectively abut against one end of the first spring and one end of the second spring, and an initial elastic deformation force of the second spring is greater than an elastic deformation force of the first spring when the first valve port is closed; a support cap and a second retainer are further provided inside a cavity of the main body portion, and the support cap is fixed by the second retainer, one end of the second spring abuts against an inner bottom surface of a bottom portion of the main body portion, and another end of the second spring abuts against the support cap, the second spring is in the compressed state, and the second notch is located between the support portion and the second retainer.

5. The heat exchange assembly according to claim 4, wherein the support cap comprises an outer extension portion, and the outer extension portion is in a clearance fit or a sliding fit with an inner wall of the cavity of the main body portion, the outer extension portion is provided with at least one slot opening, and a passage allowing fluid to flow through is formed between the slot opening and the inner wall of the cavity of the main body portion; and the main body portion is provided with a third notch at a portion opposite to an upper end portion of the support cap, and the third notch is in communication with the passage allowing fluid to flow through and formed between the slot opening and the inner wall of the cavity of the main body portion.

6. The heat exchange assembly according to claim 5, wherein the support portion is further provided with a second valve port, and the second valve port is opened and closed by the thermal actuator;

when the first valve port is closed, the second notch is in communication with the first notch through the second valve port, the third notch is in communication with the first notch through the passage allowing fluid to flow through and formed between the slot opening and the inner wall of the cavity of the main body portion and the second valve port sequentially, and a third opening is provided at the bottom portion of the main body portion, and the third opening is in communication with the first notch through the allowing fluid to flow through and formed between the slot opening and the inner wall of the cavity of the main body portion and the second valve port sequentially;

when the second valve port is closed and the first valve port is opened, the third port is in communication with the fourth port through the first passage, the second passage, the first notch and the first valve port sequentially, and the third port is not in communication with the fifth port; and when the first valve port is closed and the second valve port is opened, the third port is in communication with the fifth port through the first passage, the second passage, the first notch and the second valve port sequentially, and the third port is not in communication with the fourth port.

7. The heat exchange assembly according to claim 1, wherein the mounting plate comprises a first mounting plate and a second mounting plate, the second mounting plate is further provided with a connection hole connected to the through hole, and the first mounting plate is provided with a groove, two ends of the groove are respectively in communication with the connection hole and the fourth port, and the groove cooperates with the second mounting plate to form a connection passage communicating the through passage with the fourth port.

8. The heat exchange assembly according to claim 7, wherein the adapter base comprises a first adapter base and a second adapter base, the first adapter base comprises an accommodation cavity and the fifth port in communication with the accommodation cavity; and the second adapter base comprises a base body, the cavity passing through the base body, and the sixth port; the accommodation cavity is opposite to the cavity passing through the base body, and the fifth port is in communication with the cavity passing through the base body through the accommodation cavity, and a retainer ring is further provided in the second adapter base, to fix the valve assembly and limit an axial displacement of the valve assembly.

9. The heat exchange assembly according to claim 8, wherein the main valve body comprises a first fitting portion, a second fitting portion, a third fitting portion, a flow guide portion and a fourth fitting portion, outer diameters of which decrease in sequence respectively; a step formed between the first fitting portion and the second fitting portion abuts against a step formed by an inner wall of the base body corresponding to the cavity passing through the base body; the first fitting portion and the second fitting portion are in a clearance fit with the inner wall of the base body corresponding to the cavity passing through the base body; a sealing ring is further provided between the second fitting portion and the inner wall of the base body corresponding to the cavity passing through the base body; the third fitting portion and the flow guide portion are located in the second passage; an outer diameter of the third fitting portion is smaller than an inner diameter of the second passage; and the fourth fitting portion is located in the fourth port, the fourth fitting portion is in a clearance fit with the fourth port, and a sealing ring is further provided between the fourth fitting portion and the fourth port.

10. A system for adjusting a temperature of transmission oil, wherein the system for adjusting the temperature of transmission oil comprises a transmission, a heat exchange assembly, and an oil cooler, wherein the heat exchange assembly is the heat exchange assembly according to claim 1, and wherein the third port and the fourth port are in communication with an inlet and an outlet of the transmission directly or through pipelines, and an outlet of one flow passage of the oil cooler is in communication with the sixth port of the heat exchange assembly through a pipeline, and an inlet of the flow passage of the oil cooler is in communication with the fifth port; and wherein, when a temperature of a cooling oil coming out of the outlet of the transmission and entering the heat exchange core for heat exchange is in a normal state, the cooling oil enters the valve assembly through the first notch, and since the thermal actuator is under the action of a restoring force of the first spring, the first valve port is in an open state, and the cooling oil flows through the first valve port and flows back to the transmission through the fourth port and the inlet of the transmission; and when the temperature of the cooling oil coming out of the outlet of the transmission and entering the heat exchange core for heat exchange is relatively high, the cooling oil flows into the valve assembly through the first notch, at this time, the thermal actuator is thermally expanded to close the first valve port, the first valve port is in a closed state, and the cooling oil flows to the oil cooler through the fifth port, and the cooling oil flowing out of the oil cooler flows through the through passage and the fifth port and then flows back to the transmission through the inlet of the transmission.

11. The heat exchange assembly according to claim 1, wherein the valve assembly further comprises a lower valve bush, a part of the lower valve bush is located in the accommodation cavity, and another part of the lower valve bush is located at the second opening and is fixed to an inner wall of the second opening in a sealed manner; and the lower valve bush comprises a valve seat portion, a spring support seat, a fitting portion and a through hole passing through the lower valve bush; the first valve port is located at the valve seat portion, and the first valve port is a part of the through hole, and the fitting portion is fixed to the inner wall of the second opening in a sealed manner; and wherein, when the first valve port is closed, the first notch is not in communication with the second opening, and a fourth notch is provided between the spring support portion and the valve seat portion, the fourth notch is in communication with a part, corresponding to the fitting portion, of the through hole, and the fourth notch is in communication with the second opening through the through hole; an outer diameter of the valve seat portion is greater than an outer diameter of each of other parts of the lower valve bush, and the outer diameter of the valve seat portion is smaller than an inner diameter of the accommodation cavity, and a passage allowing fluid flow is formed between an outer wall of the valve seat portion and the accommodation cavity; a pressure relief ring and a third spring are provided in the accommodation cavity, the pressure relief ring is provided with a through hole, the pressure relief ring is sleeved on the lower valve bush though the through hole, and an inner diameter of the through hole is smaller than the outer diameter of the valve seat portion, and the pressure relief ring is in a sliding fit with the inner wall corresponding to the accommodation cavity; one end of the third spring abuts against the pressure relief ring, and another end of the third spring abuts against the inner wall of the main valve body, and the pressure relief ring abuts against the valve seat portion through the third spring; and wherein, when the pressure relief ring abuts against or is away from the valve seat portion, the passage allowing fluid flow formed between the outer wall of the valve seat portion and the accommodation cavity is not in communication with the fourth notch or in communication with the fourth notch.

12. A heat exchange assembly, comprising a heat exchange core and a mounting plate fixed to the heat exchange core, and the heat exchange assembly further comprising a first port, a second port, a third port, and a fourth port; the heat exchange core comprising an end plate, and the heat exchange core further comprising a first flow passage and a second flow passage which are isolated from each other, the first flow passage being in communication with the first port and the second port, and the second flow passage being in communication with the third port and the fourth port; and the second flow passage comprising a first passage and a second passage, and wherein one end of the first passage is in communication with the third port, another end of the first passage is blocked by the end plate, and the second passage passes through the heat exchange core and one end of the second passage is in communication with the fourth port;

wherein, the heat exchange assembly further comprises a valve assembly and an adapter base, the adapter base is provided with a fifth port, and the valve assembly is provided in or partially provided in the second passage, and the valve assembly comprises a main valve body and a thermal actuator mounted in the main valve body, and one end of the main valve body is fittingly connected to an inner wall of the fifth port in a sealed manner, and one end of the main valve body is fittingly connected to the fourth port or an inner wall of the second passage in a sealed manner, a side wall of the main valve body is provided with a first notch, and a first valve port is provided in the main valve body, the first valve port is located between the first notch and the fourth port, and the first valve port is not in communication or in communication with the fourth port through an action of the thermal actuator; and wherein, when the first valve port is opened, the third port is in communication with the fourth port through the first passage, the second passage, the first notch, and the first valve port sequentially; and when the first valve port is closed, the third port is in communication with the fifth port through the first passage, the second passage, and the first notch sequentially.

13. The heat exchange assembly according to claim 3, wherein the main body portion is provided with a cavity, and the main body portion is provided with a second notch in communication with the cavity in the main body portion, and the second notch is in communication with the fifth port; and when the first valve port is opened, the third port is in communication with the fourth port through the first passage, the second passage, the first notch and the first valve port sequentially; and when the first valve port is closed, the third port is in communication with the fifth port through the first passage, the second passage, the first notch and the second notch sequentially.

14. The heat exchange assembly according to claim 2, wherein the mounting plate comprises a first mounting plate and a second mounting plate, the second mounting plate is further provided with a connection hole connected to the through hole, and the first mounting plate is provided with a groove, two ends of the groove are respectively in communication with the connection hole and the fourth port, and the groove cooperates with the second mounting plate to form a connection passage communicating the through passage with the fourth port.

15. The heat exchange assembly according to claim 14, wherein the adapter base comprises a first adapter base and a second adapter base, the first adapter base comprises an accommodation cavity and the fifth port in communication with the accommodation cavity; and the second adapter base comprises a base body, the cavity passing through the base body, and the sixth port; the accommodation cavity is opposite to the cavity passing through the base body, and the fifth port is in communication with the cavity passing through the base body through the accommodation cavity, and a retainer ring is further provided in the second adapter base, to fix the valve assembly and limit an axial displacement of the valve assembly.

16. The heat exchange assembly according to claim 2, wherein the valve assembly further comprises a lower valve bush, a part of the lower valve bush is located in the accommodation cavity, and another part of the lower valve bush is located at the second opening and is fixed to an inner wall of the second opening in a sealed manner; and the lower valve bush comprises a valve seat portion, a spring support seat, a fitting portion and a through hole passing through the lower valve bush; the first valve port is located at the valve seat portion, and the first valve port is a part of the through hole, and the fitting portion is fixed to the inner wall of the second opening in a sealed manner; and wherein, when the first valve port is closed, the first notch is not in communication with the second opening, and a fourth notch is provided between the spring support portion and the valve seat portion, the fourth notch is in communication with a part, corresponding to the fitting portion, of the through hole, and the fourth notch is in communication with the second opening through the through hole; an outer diameter of the valve seat portion is greater than an outer diameter of each of other parts of the lower valve bush, and the outer diameter of the valve seat portion is smaller than an inner diameter of the accommodation cavity, and a passage allowing fluid flow is formed between an outer wall of the valve seat portion and the accommodation cavity; a pressure relief ring and a third spring are provided in the accommodation cavity, the pressure relief ring is provided with a through hole, the pressure relief ring is sleeved on the lower valve bush though the through hole, and an inner diameter of the through hole is smaller than the outer diameter of the valve seat portion, and the pressure relief ring is in a sliding fit with the inner wall corresponding to the accommodation cavity; one end of the third spring abuts against the pressure relief ring, and another end of the third spring abuts against the inner wall of the main valve body, and the pressure relief ring abuts against the valve seat portion through the third spring; and wherein, when the pressure relief ring abuts against or is away from the valve seat portion, the passage allowing fluid flow formed between the outer wall of the valve seat portion and the accommodation cavity is not in communication with the fourth notch or in communication with the fourth notch.

17. The heat exchange assembly according to claim 3, wherein the mounting plate comprises a first mounting plate and a second mounting plate, the second mounting plate is further provided with a connection hole connected to the through hole, and the first mounting plate is provided with a groove, two ends of the groove are respectively in communication with the connection hole and the fourth port, and the groove cooperates with the second mounting plate to form a connection passage communicating the through passage with the fourth port.

18. The heat exchange assembly according to claim 17, wherein the adapter base comprises a first adapter base and a second adapter base, the first adapter base comprises an accommodation cavity and the fifth port in communication with the accommodation cavity; and the second adapter base comprises a base body, the cavity passing through the base body, and the sixth port; the accommodation cavity is opposite to the cavity passing through the base body, and the fifth port is in communication with the cavity passing through the base body through the accommodation cavity, and a retainer ring is further provided in the second adapter base, to fix the valve assembly and limit an axial displacement of the valve assembly.

19. The heat exchange assembly according to claim 3, wherein the valve assembly further comprises a lower valve bush, a part of the lower valve bush is located in the accommodation cavity, and another part of the lower valve bush is located at the second opening and is fixed to an inner wall of the second opening in a sealed manner; and the lower valve bush comprises a valve seat portion, a spring support seat, a fitting portion and a through hole passing through the lower valve bush; the first valve port is located at the valve seat portion, and the first valve port is a part of the through hole, and the fitting portion is fixed to the inner wall of the second opening in a sealed manner; and wherein, when the first valve port is closed, the first notch is not in communication with the second opening, and a fourth notch is provided between the spring support portion and the valve seat portion, the fourth notch is in communication with a part, corresponding to the fitting portion, of the through hole, and the fourth notch is in communication with the second opening through the through hole; an outer diameter of the valve seat portion is greater than an outer diameter of each of other parts of the lower valve bush, and the outer diameter of the valve seat portion is smaller than an inner diameter of the accommodation cavity, and a passage allowing fluid flow is formed between an outer wall of the valve seat portion and the accommodation cavity; a pressure relief ring and a third spring are provided in the accommodation cavity, the pressure relief ring is provided with a through hole, the pressure relief ring is sleeved on the lower valve bush though the through hole, and an inner diameter of the through hole is smaller than the outer diameter of the valve seat portion, and the pressure relief ring is in a sliding fit with the inner wall corresponding to the accommodation cavity; one end of the third spring abuts against the pressure relief ring, and another end of the third spring abuts against the inner wall of the main valve body, and the pressure relief ring abuts against the valve seat portion through the third spring; and wherein, when the pressure relief ring abuts against or is away from the valve seat portion, the passage allowing fluid flow formed between the outer wall of the valve seat portion and the accommodation cavity is not in communication with the fourth notch or in communication with the fourth notch.

* * * * *